United States Patent
Stenkvist

Patent Number: 5,787,109
Date of Patent: Jul. 28, 1998

[54] FURNACE VESSEL FOR A DC ARC FURNACE

[75] Inventor: Sven-Einar Stenkvist, Brugg, Switzerland

[73] Assignee: Asea Brown Boveri AG, Baden, Switzerland

[21] Appl. No.: 566,160

[22] Filed: Dec. 1, 1995

[30] Foreign Application Priority Data

Dec. 24, 1994 [DE] Germany ............ 44 46 542.4

[51] Int. Cl.$^6$ ............................................. H05B 7/144
[52] U.S. Cl. ................... 373/107; 373/71; 373/75; 373/103; 373/108
[58] Field of Search ............... 373/71, 72, 75, 373/76, 102, 103, 107, 108

[56] References Cited

U.S. PATENT DOCUMENTS

| | | | |
|---|---|---|---|
| 3,683,094 | 8/1972 | Schlienger | 373/107 |
| 4,149,024 | 4/1979 | Stenkvist et al. | 373/107 |
| 4,581,745 | 4/1986 | Mathews et al. | 373/107 |
| 5,138,629 | 8/1992 | Maki et al. | |
| 5,526,374 | 6/1996 | Uebber | 373/107 |

FOREIGN PATENT DOCUMENTS

| | | |
|---|---|---|
| 0 258 101 | 3/1988 | European Pat. Off. |
| 0158937 B1 | 3/1989 | European Pat. Off. |
| 0518070 A1 | 12/1992 | European Pat. Off. |
| 0 600 362 | 6/1994 | European Pat. Off. |
| 2 298 249 | 8/1976 | France |
| 2 345 680 | 10/1977 | France |
| 2 602 318 | 2/1988 | France |
| 2745622 C2 | 2/1983 | Germany |
| 40 35 233 | 5/1991 | Germany |
| 4235662 A1 | 4/1994 | Germany |
| 43 38 555 | 4/1995 | Germany |
| 4338555 C1 | 4/1995 | Germany |
| 2 046 560 | 11/1980 | United Kingdom |
| 2 094 119 | 9/1982 | United Kingdom |

*Primary Examiner*—Tu B. Hoang
*Attorney, Agent, or Firm*—Oblon, Spivak, McClelland, Maier & Newstadt, P.C.

[57] ABSTRACT

The furnace vessel for a DC arc furnace has a thermostable wall which preferably consists, in the region situated above the slag line (S), of a plurality of water-cooled wall segments (1) made from steel. These wall segments are fastened to a support structure (13–18). At least one of the wall segments (3) consists of nonmagnetic steel or copper and is preferably arranged on the side of the furnace vessel (5) opposite the power supply device (7). In this way, the influence of the high-current lines which extend below or beside the furnace vessel and cause a deflection of the arc can be compensated.

The effect of this nonmagnetic wall segment can be partially or virtually entirely cancelled by a trimming plate (19) which is detachably fastened from the outside to the nonmagnetic wall segment (3), in order in this way to achieve optimum trimming of the deflection of the arc.

9 Claims, 7 Drawing Sheets

FURNACE VESSEL FOR A DC ARC FURNACE

BACKGROUND OF THE INVENTION

1. Field of the Invention

The invention relates to a furnace vessel for a DC arc furnace having a thermostable wall and an outer vessel shell made from steel, and a floor electrode and a fusing electrode which are fed via high-current lines from a power supply device located to the side outside the vessel.

A furnace vessel of this generic type is disclosed in the undated company publication from ABB Process Automation Ltd., CH-5401 Baden/Switzerland "Arc Furnaces", in particular page 9, the figure at top left.

2. Discussion of Background

Metal melting furnaces are normally designed as a steel construction. Linings made from refractory material are provided in the region of the melt for the purpose of protection against the high temperatures in the vessel. Above the zone of fusion (slag line), the vessel shell consists of water-cooled wall segments, also termed cooling panels, in order to protect the stressed parts against the action of heat.

Such a vessel is disclosed for a metal melting furnace in the company document "Arc Furnaces" mentioned at the beginning, or else DE-27 45 622 C2. The region of the vessel wall situated above the slag line consists of cooling panels which are assembled from steel tubes. In the case of the vessel in the company document, the tubes are distanced from one another, and the distances between the tubes are filled up by means of metal strips. In the case of the vessel in accordance with DE-27 45 622 C2, the wall panels consist of cooling tube coils which are arranged tightly one on another and exposed on both sides. In both cases, they are fastened to a support wall constructed as a plate shell or skeleton.

It has emerged in the case of new high-power DC furnaces that the arc is more or less strongly deflected to the side. This deflection is caused by the magnetic field which surrounds the high-current lines, and is attended by heavy wear of the furnace wall and furnace cover. In addition, the asymmetrical energy distribution in the furnace causes additional energy losses.

Up to now, use has been made in essence of two countermeasures in order to eliminate the lateral deflection of the arc:

- eccentric offsetting of electrode in the direction away from the deflection (EP-0 158 937 B1);
- displacing the high-current lines to a higher plane around the furnace platform and not leading them downward to the terminals of the floor electrode until on the side of the furnace vessel away from the power supply device (EP-0 518 070 A1).

It has been possible to demonstrate an effect on the arc deflection for both countermeasures. In this case, the practically realizable eccentric offsetting has proved to be insufficient to ensure complete reduction of the deflection. In contrast, the specific displacement of the high-current lines has proved itself as an effective countermeasure. However, it has the disadvantage that the effects of these measures are extremely difficult to determine in advance, because all the magnetic components located on the furnace and at its installation site and their magnetic saturation cannot be included in a calculation.

It has been shown in practice that the special displacement of the high-current lines entail the risk of overcorrection of the deflection: the targeted compensation of the arc deflection leads to a deflection in the counter direction, which leads only to shifting the problems associated with the deflection to another region in the interior of the furnace vessel.

Although it would be possible taking account of this experience for the high-current conductor system to be recalculated, redesigned or rebuilt, there would be no assurance that the deflection would subsequently be successfully reduced. In addition, rebuilding the high-current conductor system is expensive and time consuming. Again, the furnace would have to be put out of operation during a certain time. Even if it were possible in this way to find a solution for a specific furnace size and electrode current, said solution would not necessarily be transferable to another furnace size and/or furnace power.

SUMMARY OF THE INVENTION

Accordingly, one object of the invention is to provide, in the case of a vessel for a DC arc furnace, novel measures which permit simple trimming of the correction of the deflection and can be implemented without shutting down or even rebuilding the furnace and, in addition, are suitable for all furnace sizes and furnace powers.

This object is achieved according to the invention when at least one wall section of the vessel shell consists of a nonmagnetic material, preferably nonmagnetic steel or copper, which is preferably arranged on the side of the furnace vessel opposite the power supply device.

The invention can be advantageously implemented chiefly in the case of furnace vessels which consist in the region situated above the slag line of a plurality of water-cooled wall segments which are made from steel and are fastened to a support structure.

The invention is based here on the following findings:

The direct current flowing through the electrode generates a magnetic field around the electrode. In the ideal case of the infinitely long electrode, and given the absence of magnetic components, it holds that $$B = \mu_0 \cdot I/2\pi r$$

wherein B=the magnetic field in teslas, I is the current through the electrode in amperes, r is the distance from the electrode longitudinal axis in metres an $\mu_0$ is a constant ($4\pi \cdot 10^{-7}$). In practice, the electrode has a finite length, and this leads to a reduction in the magnetic field. Magnetic components in the vicinity of the electrode, that is to say, for example, vessel walls, lead to a redistribution of the magnetic field which is not easy to calculate. In particular, the influence of the high-current lines laid below the furnace vessel is active here.

If one or more (normally) magnetic wall segments are replaced by segments made from nonmagnetic material, this produces a concentration of the magnetomotive forces in the region of this segment. The redistribution thereby produced in the magnetic field of the electrode through which current flows can be represented by an additional magnetic field (window field). These field lines of the "window field" intersect the arc in the region of the electrode. This produces a force on the arc which is directed away from the nonmagnetic wall segment. Thus, it is possible in this way largely to compensate the influence of the high-current lines which extend below or beside the furnace vessel and lead from the power supply device to the floor electrode.

Because even the installation of a single wall segment made from nonmagnetic material can effect overcompensation of the deflection, it is the aim of a development of the invention to weaken the compensating influence of this window field by providing that the nonmagnetic wall segment can be covered at most partially from outside by means of a trimming plate made from magnetic material. This trimming plate can be arranged directly and without a significant spacing on the nonmagnetic wall segment, it being possible for said wall segment to overlap the neighboring "normal" wall segment(s). However, it can also be mounted spaced from the nonmagnetic wall segment, for example also outside the support structure of the wall segments. This trimming plate can be split up into sections which are easy to install or remove. A particularly advantageous variant provides to construct the trimming plates in two parts which can be displaced relative to one another, with the result that the plate halves approach one another to a greater or lesser degree, or that the two plate halves are partially pushed over the adjoining "normal" wall segments. The effective trimming plate surface can be easily varied in this way. Another possibility of variation consists in varying the spacing of the trimming plate(s) from the nonmagnetic wall segment. If the trimming plate is displaced outward, that is to say further away from the furnace vessel, the compensation of the deflection becomes stronger. Displacing the trimming plate(s) inwards effects a weakening of the compensation. If the nonmagnetic wall segment is completely covered without a spacing by a trimming plate, the compensating force is reduced to zero.

Because such manipulations can be carried out without shutting down the furnace, it is now possible for the first time for the observations of the furnace operation carried out by the operating staff with regard to arc deflection and wear to be converted into countermeasures for trimming the arc deflection until the desired compensation of the arc deflection is achieved. In the case of multipart trimming plates, this manipulation can even be performed by remote control in a simple way.

In practice, the procedure in this case is to go so far as to accept a priori and on purpose an overcompensation by the nonmagnetic wall segment, in order then to be able to achieve an optimum field distribution by means of the said trimming.

A further general advantage of the invention is that it is possible for each furnace to be retrofitted with a segmented upper furnace having nonmagnetic wall segments and also trimming devices, because the latter can be combined to form a structural unit with the wall segment to be installed anew.

Exemplary embodiments of the invention together with the further advantages achievable therewith, are explained in more detail below with the aid of the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
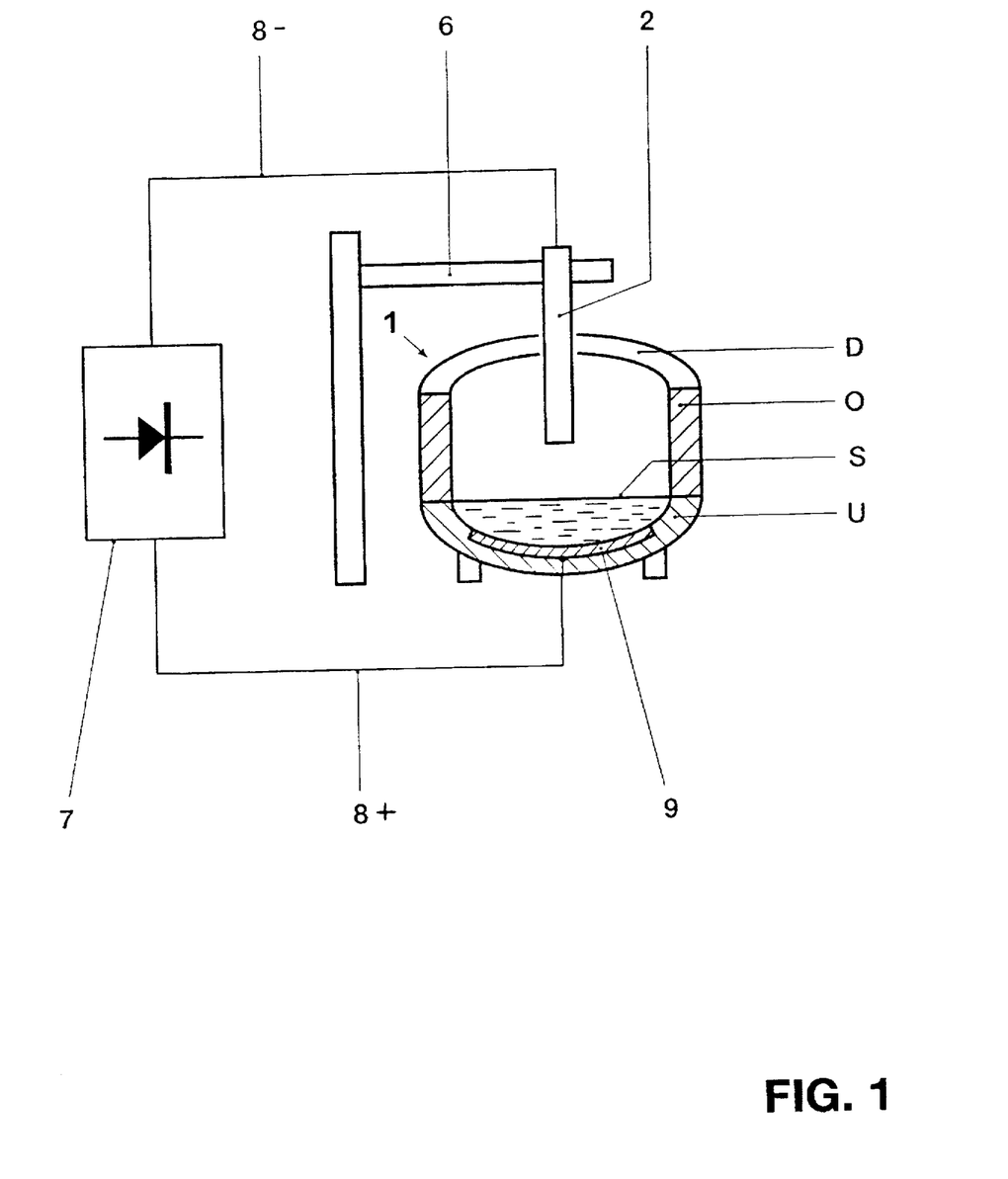
FIG. 1 shows a DC arc furnace installation having a furnace vessel, a fusing electrode, a power supply device and high-current lines leading from the latter to the fusing electrode and the floor electrode.

Referring now to the drawings, wherein like reference numerals designate identical or corresponding parts throughout the several views, in the DC arc furnace installation represented greatly simplified in FIG. 1 the furnace vessel is denoted by 1, the fusing electrode, which is arranged on an electrode support arm 6, by 2, and the power supply device, located next to the furnace vessel, by 7. A high-current line 8– leads to the fusing electrode 2, and another 8+ to the floor electrode 9. The furnace vessel itself comprises a lower furnace U, an upper furnace O and a furnace cover D. The upper furnace O above the slag line S is assembled from water-cooled wall segments made from steel, which wall segments correspond with respect to structural design, fastening and connections for the cooling liquid to that of the raw segments as they are described and represented in the company document mentioned at the beginning, page 9, left-hand upper figure, or in FIG. 1 and FIG. 2 of DE-27 45 622 C2.

According to the invention, the vessel wall of the upper furnace in the wall section which in the normal case is opposite the power supply device 7 consists of one or more wall segments 3 made from nonmagnetic steel or copper.

The wall segment comprises tubes 10 made from nonmagnetic steel which extend in the horizontal direction. In the case of the example, these are not situated tightly one on another, but are spaced from one another (in the vertical direction) and joined (for example welded) to one another by means of metal strips 11 made from the same material as the tubes 10. The remaining interspaces 12 between the tubes 10 are filled up with a refractory material before or after the installation of the wall segment 3. The same also holds for the gap between neighboring wall segments. The wall segment 3 is held by a skeleton-like support structure, of which the tubes 13, 14, 15 and 16 for the supply and removal of the cooling liquid are represented in the case of the example. Also part of the support structure is a support angle 17, by means of which the wall segment rests on the lower furnace (not represented), as well as a support plate 18 as bearing surface for the furnace cover (likewise not represented). To this extent, the design of the wall segment corresponds— disregarding the material of the tubes 10 and metal strips 11, to the prior art.

As was set forth in detail at the beginning, the installation of a wall segment made from nonmagnetic material, preferably nonmagnetic steel or copper, permits the deflection of the arc to be decisively influenced. Depending on segmentation, it can be necessary in this case not only to construct a wall segment in the way described; two or more neighboring wall segments can also consist of the said material. It is preferable to proceed such that overcompensation of the arc deflection is provided from the very start, so that it is possible to carry out fine tuning on the basis of operational experience.

The fine tuning is performed according to the invention by mounting one or more trimming plates 19 or 20a and 20b, from the outside on the nonmagnetic wall segment(s) 3.

Figure 2:
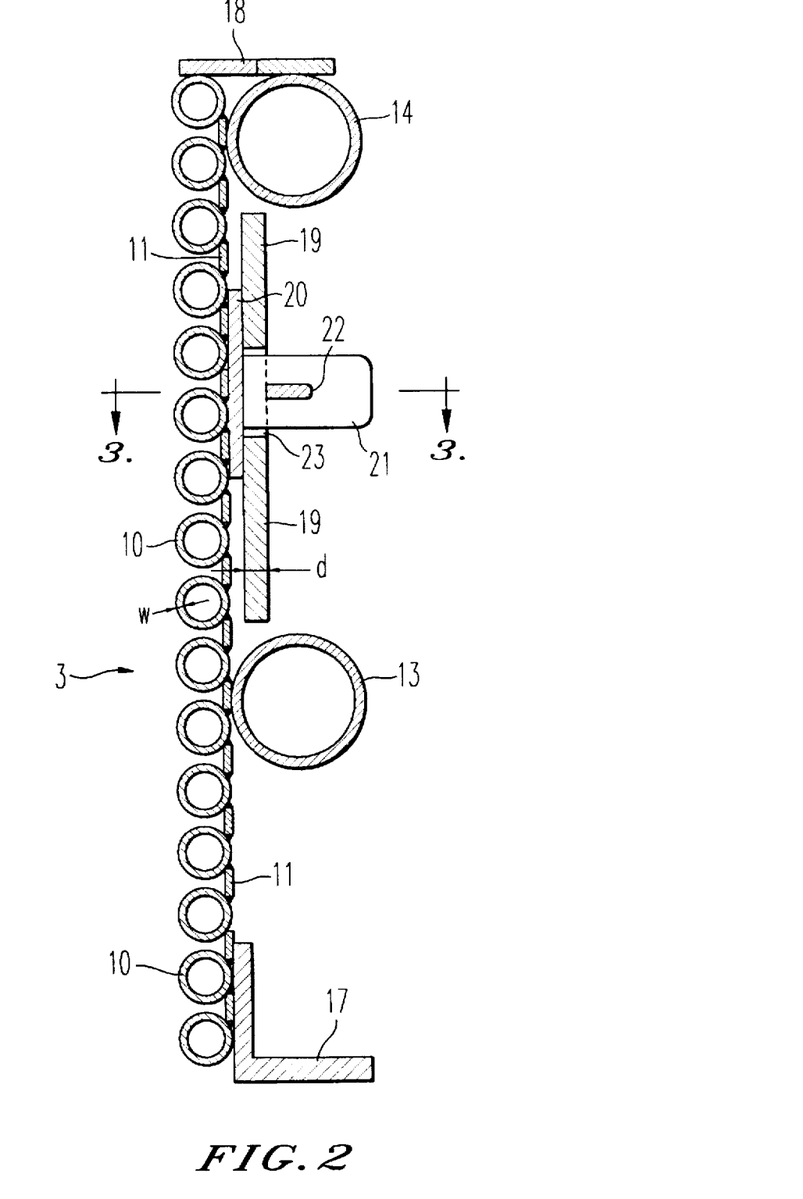
FIG. 2 shows a first exemplary embodiment of the invention in the form of a longitudinal section through the vessel wall of a DC arc furnace having a nonmagnetic wall segment which is partially covered from outside by a trimming plate.
Figure 3:
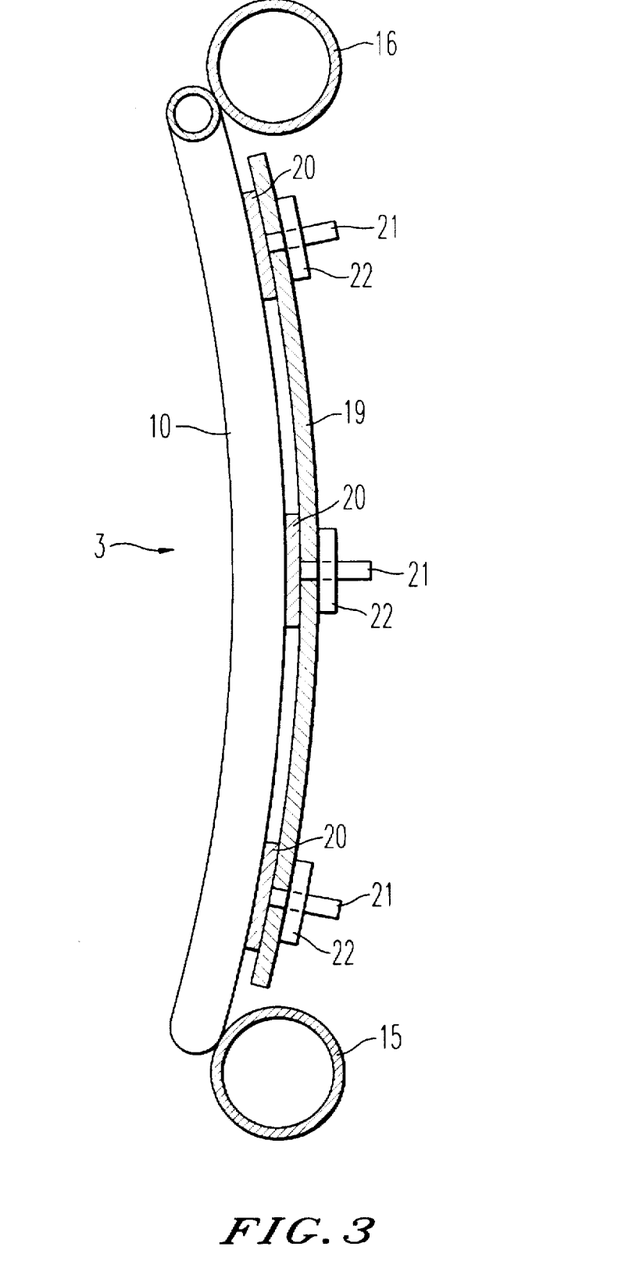
FIG. 3 shows a section through the wall segment in accordance with FIG. 2 along the line AA thereof.

In a first embodiment, as represented in FIG. 2 and FIG. 3, in order to reduce the effect of the wall segment 3 made from nonmagnetic material a trimming plate 19 is detachably fastened directly to the outside thereof. Mounted for this purpose on the tubes 10 and metal strips 11 are intermediate plates 20 made from nonmagnetic material which are provided with outwardly directed, vertically extending lugs 21. The latter have an opening through which wedges 22 are plugged. The trimming plate 19 has cutouts 23, with the result that they can be pushed over the lugs 21 and can be wedged by means of the wedges 22. The wall thickness d of the trimming plate is selected such that it is at least twice as thick as the wall thickness w of the tubes 10.

In FIGS. 2 and 3, only one trimming plate 19 is provided for a wall segment 3 which in the case of the example covers approximately half the wall segment area. It goes without saying, however, that a further trimming plate can be installed in the space between the tube 13 and the support angle 17 and can be fastened there in the same way. Again, the trimming plate 19 can be subdivided in the circumferential direction and the parts can be fastened separately, in order to permit the arc to be influenced optimally on the basis of operating experience.

Figure 4:
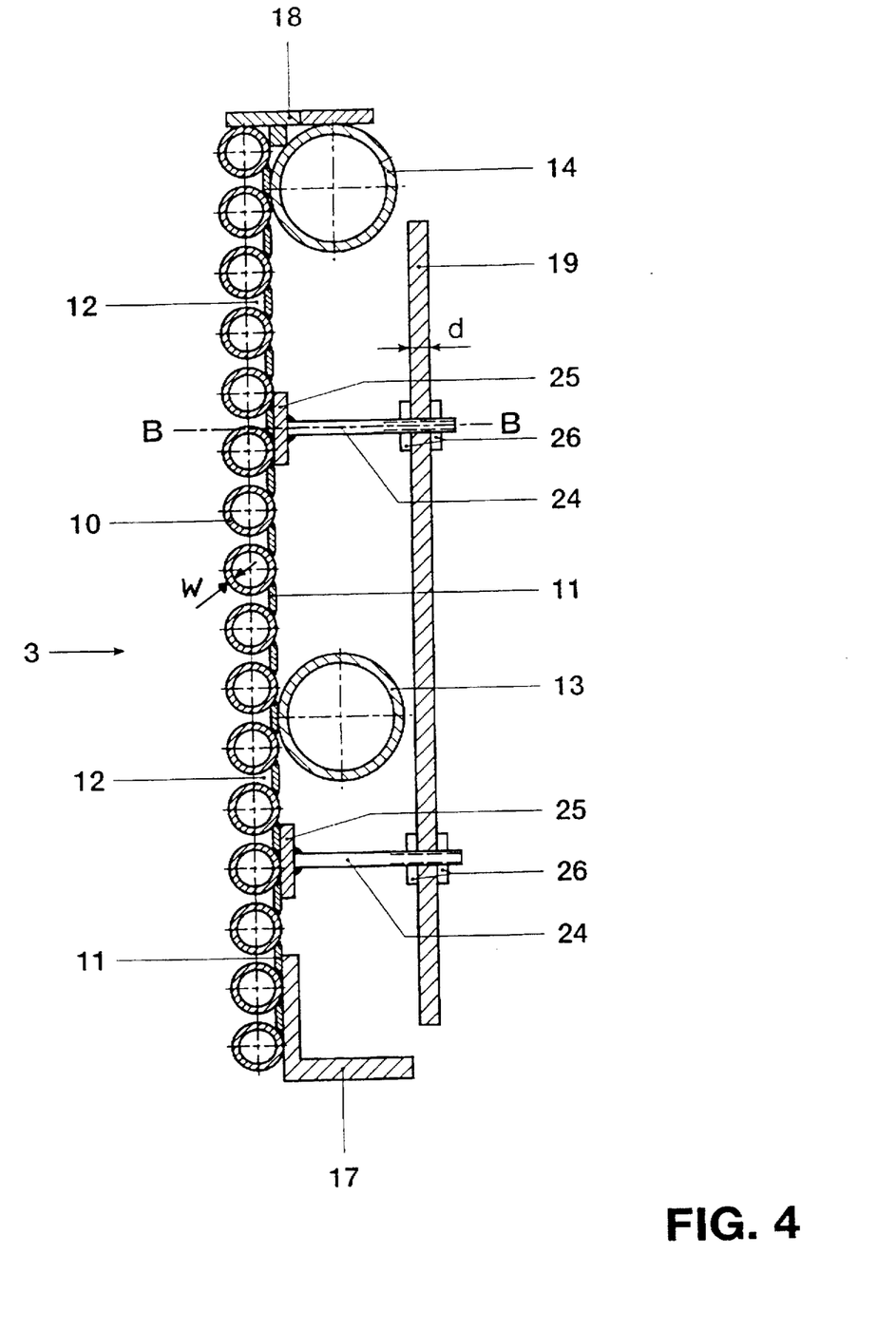
FIG. 4 shows a second exemplary embodiment of the invention in the form of a longitudinal section through the vessel wall of a DC arc furnace having a nonmagnetic wall segment which is partially covered from outside by a trimming plate, the trimming plate being fastened by means of spacing bolts.
Figure 5:
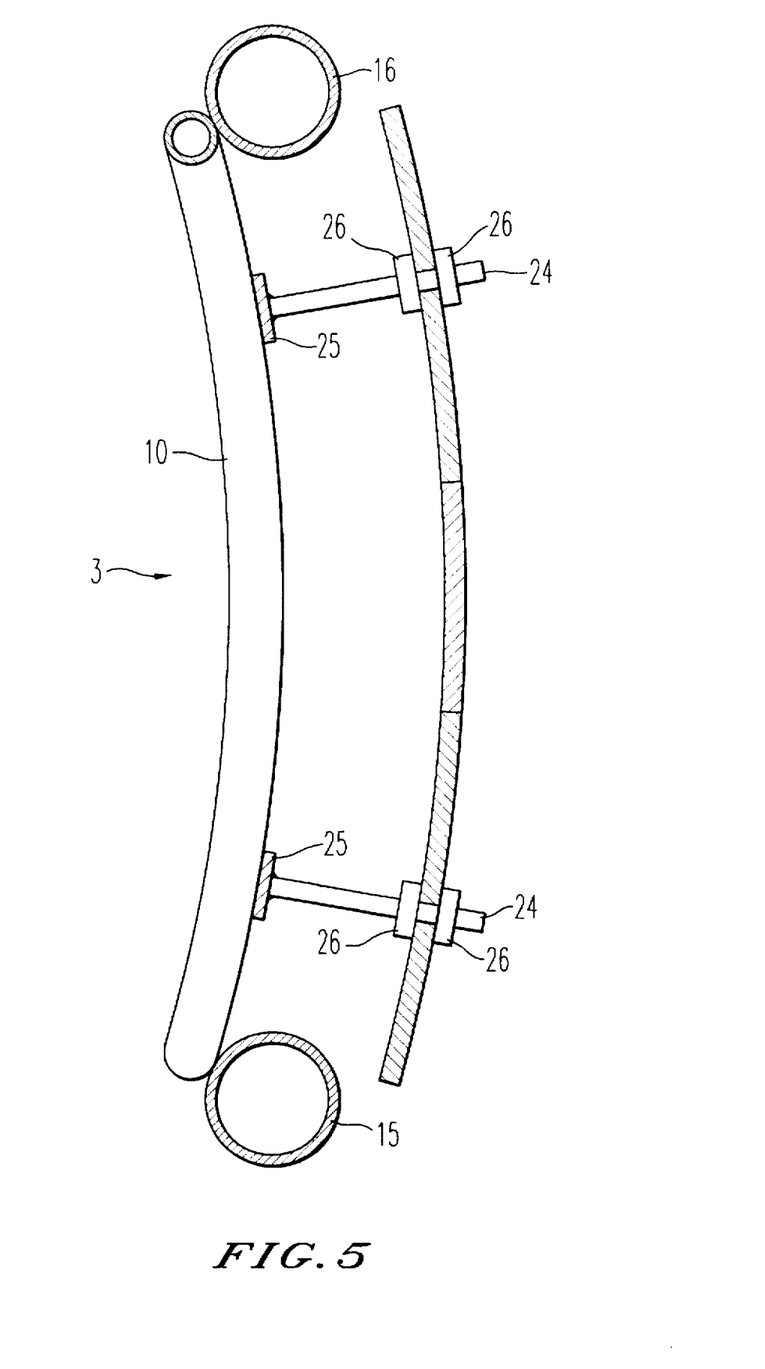
FIG. 5 shows a section through the wall segment in accordance with FIG. 4 along the line BB thereof.

Instead of one of more trimming plates 19 which rest in practice on the outer wall of the wall segment, it is also possible to use a single trimming plate 19 which virtually covers the entire outer surface of the wall segment. This possibility is demonstrated by way of example in FIGS. 4 and 5. There, the trimming plate 19 is fastened to the nonmagnetic wall segment 3 by means of threaded stay-bolts 24. The wall thickness d of the trimming plate is selected, in turn, such that it is at least twice as thick as the wall thickness w of the tubes 10. The stay-bolts 24 are fastened to bolt plates 25 which for their part are welded onto the outer wall of the wall segment 3.

Since the spacing of the trimming plate 19 from the wall segment 3 (tubes 10) decisively determines the trimming effect, and thereby the spacing should be adjustable, this spacing variation is achieved simply by displacing the trimming plate 19 onto the shredded stay-bolts 24 after loosening the fastening nuts 26 and subsequent fixing. Instead of stay-bolts and nuts, it is also possible to have a spacing variation by means of telescopically interacting bolts and tubes which are fastened to the trimming plate 19 (not represented in FIGS. 4 and 5). It is also possible in the case of this embodiment to subdivide the trimming plate 19 and to be able to fasten or displace the parts separately from one another.

Figure 6:
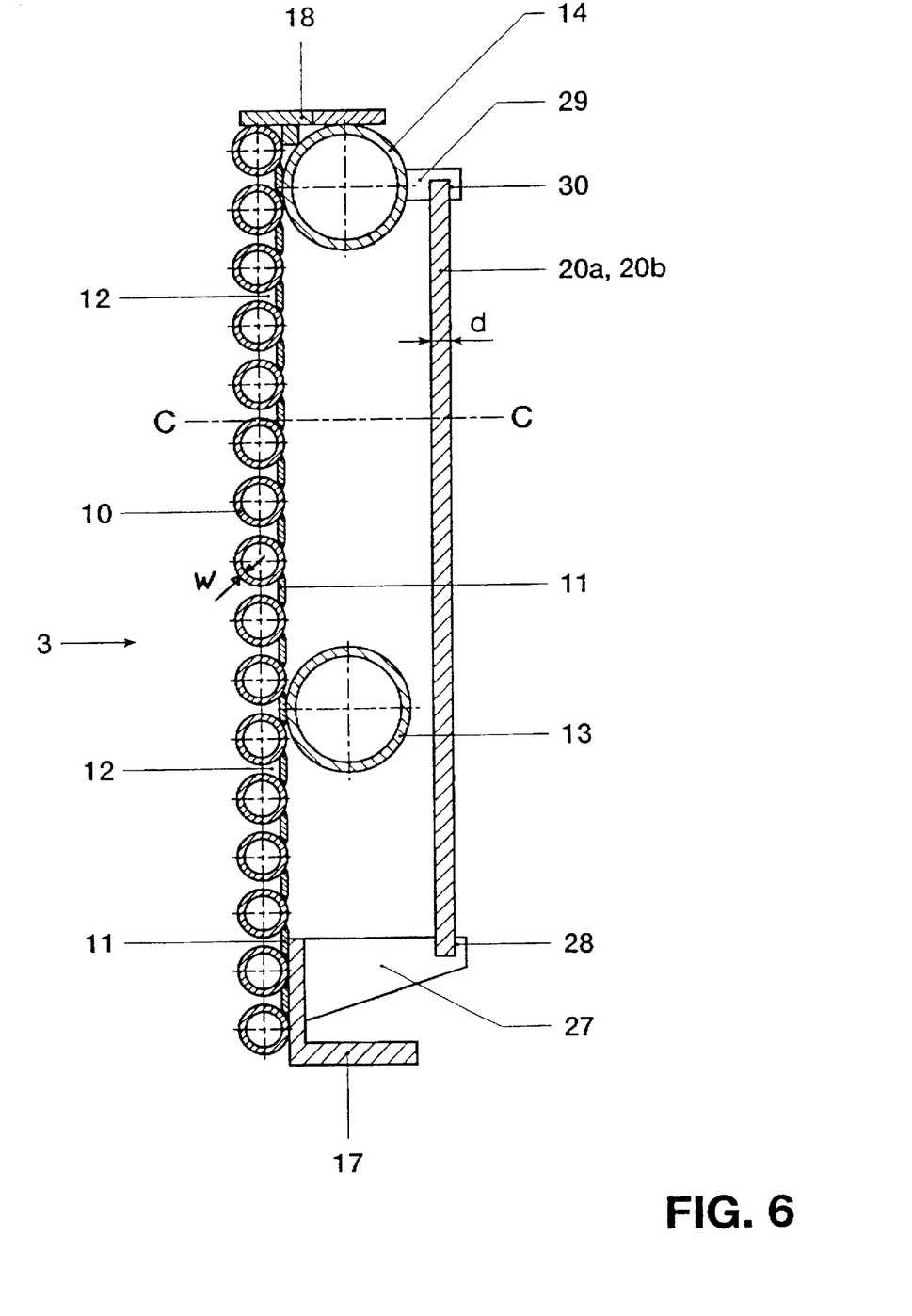
FIG. 6 shows a third exemplary embodiment of the invention in the form of a longitudinal section through the vessel wall of a DC arc furnace having a nonmagnetic wall segment, to which a bipartite trimming plate having mutually displaceable trimming plate halves is assigned.
Figure 7:
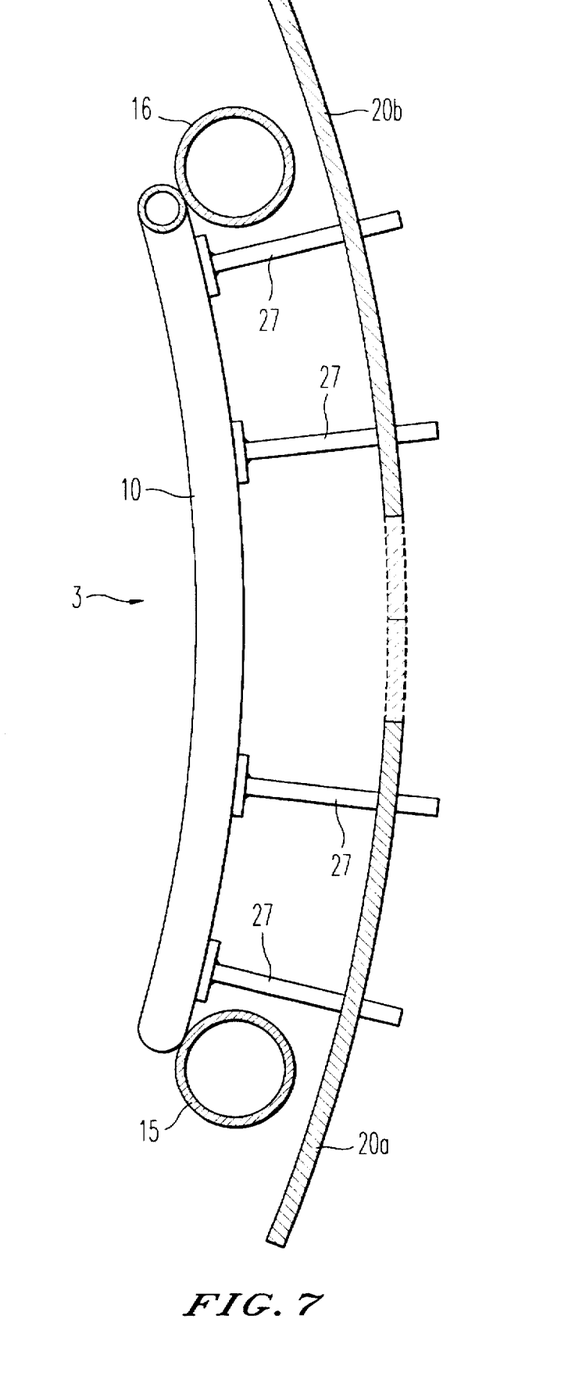
FIG. 7 shows a section through the wall segment in accordance with FIG. 6 along the line CC thereof.

In a third exemplary embodiment of the invention, as it is represented in FIGS. 6 and 7, the trimming plate is subdivided into two approximately equally large parts 20a and 20b made from (normal) magnetic material. As in the other exemplary embodiments, the wall thickness d of the trimming plate halves 20a, 20b is selected such that it is at least twice as thick as the wall thickness w of the tubes 10. The trimming plates rest at the lower end on brackets 27 which are provided with a slot 28. At the upper end, they are held in holders 29 which are fastened on the tube 14 of the support structure and which are likewise provided with slots or slits 30. In this way, the two trimming plate halves 20a and 20b can be displaced in the circumferential direction relative to one another and relative to the wall segment 3. In the pushed-together state (illustrated by dashes in FIG. 7), the two trimming plate halves 20a and 20b cover the nonmagnetic wall segment 3 completely.

The trimming is performed by displacing one or both plate halves in the circumferential direction. In this process, the outer plate end or both outer plate ends is or are pushed over the "normal" wall segments which adjoin the nonmagnetic wall segment 3, where they can no longer develop an effect magnetically. This variant is particularly suitable for remote controlled trimming, for example by one electromotive, pneumatic or hydraulic displacement of the trimming plate halves, working from a control room.

Modifications are also possible in the case of the embodiment according to FIGS. 6 and 7 without going beyond the scope set by the invention. Thus, for example, it is also possible to provide an undivided trimming plate which can be moved out to a greater or lesser extent from the region of the nonmagnetic wall segment by hand or remote control. Depending on the design features of the support structure, it can also be necessary to subdivide the trimming plate or the trimming plate halves. Fundamentally, the aim here, as also in the case of the other variants, is for the spacing of the trimming plate from the nonmagnetic wall segment and its area, and also the path of travel in the circumferential direction to be dimensioned such that optimum trimming of the deflection of the arc is possible.

A range of further possibilities are conceivable and can be implemented in addition to the possibilities outlined for fastening and moving the trimming plate or parts of the trimming plate. Thus, in the variant in accordance with FIGS. 6 and 7, trimming could also be performed not by pulling the two trimming plate halves 20a and 20b part from one another but by pushing them over one another in the region of the nonmagnetic wall segment 3.

The invention is not restricted to wall segments which are assembled from tube coils. It can, of course, also be implemented in the case of furnace vessels which have box-like panels instead of cooling tubes. In the case of such arrangements, the box walls are accordingly to be produced from nonmagnetic material.

The invention has been described above with the aid of a furnace vessel which is assembled above the slag line S from individual wall segments. The invention can be used with particular advantage for such furnace vessels, because it can also be implemented subsequently in the case of existing furnace installations. However, the invention can also be used in the case of conventional vessel designs having a furnace vessel made from steel which is provided inside with a lining made from refractory material. It then virtually goes without saying that the trimming device can be fastened either directly to the vessel shell or to an auxiliary structure. Otherwise, such a design corresponds to that described and represented for segmented vessels.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A furnace receptacle for a direct current electric arc furnace, comprising:

a heat resistant wall with an outer receptacle casing of steel and having at least one wall segmented tube of non-magnetic material;

a hearth electrode and a fusible electrode which are fed from a power supply facility located laterally outside the receptacle through high amperage conduits, and at least one adjustable, magnetic trimming plate for influencing the magnetic field within the furnace receptacle, said trimming plate separably fastened on the outer wall of said at least one non-magnetic wall segmented tube.

2. The furnace receptacle according to claim 1, wherein said at least one non-magnetic wall segmented tube with at least one trimming plate fastened to it is arranged on a side of the furnace receptacle lying opposite the power supply facility.

3. The furnace receptacle according to claim 1, wherein said at least one non-magnetic wall segmented tube does not have ferromagnetic steel or copper.

4. The furnace receptacle according to claim 3, wherein said at least one trimming plate has magnetic steel.

5. The furnace receptacle according to claim 4, characterized in that at least one trimming plate is fastened by means of at least one wedge.

6. The furnace receptacle according to claim 1, wherein the at least one trimming plate is separably fastened by means of at least one stay bolt to the at least one non-magnetic wall segmented tube and is adjustable with respect to its distance from the non-magnetic wall segmented tube.

7. The furnace receptacle according to claim 1, wherein the at least one trimming plate is arranged on the exterior of the non-magnetic wall segmented tube shiftable as a whole in the receptacle peripheral direction.

8. The furnace receptacle according to claim 1, wherein at least two trimming plates are provided which are guided shiftably on holding devices and can be moved at least one of relative to each other and relative to the non-magnetic wall segmented tube.

9. The furnace receptacle according to claim 1, wherein a thickness (d) of at least one trimming plate is at least twice as large as a wall thickness (w) of said at least one wall segmented tube.

* * * * *

UNITED STATES PATENT AND TRADEMARK OFFICE
CERTIFICATE OF CORRECTION

PATENT NO. : 5,787,109
DATED : JULY 28, 1998
INVENTOR(S) : Sven-Einar STENKVIST It is certified that error appears in the above-identified patent and that said Letters Patent is hereby corrected as shown below:

In column 6, line 37, change "part" to --apart--.

In column 7, lines 2, 13 and 18, change "segmented tube" to --segment--

In column 8, lines 7, 8, 11, 17 and 21, change "segmented tube" to --segment--.

Signed and Sealed this

Twenty-ninth Day of June, 1999

*Attest:*

Q. TODD DICKINSON

*Attesting Officer*     *Acting Commissioner of Patents and Trademarks*